US010351173B2

(12) United States Patent
Schmid et al.

(10) Patent No.: US 10,351,173 B2
(45) Date of Patent: Jul. 16, 2019

(54) WHEEL CARRIER FOR A TWO-TRACK MOTOR VEHICLE

(71) Applicant: AUDI AG, Ingolstadt (DE)

(72) Inventors: Wolfgang Schmid, Freising (DE); Thomas Klinger, Ingolstadt (DE); Ulrich Voll, München (DE); Michael Braumandl, Allershausen (DE); Heinrich Beringer, Denkendorf (DE); Achim Glas, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 69 days.

(21) Appl. No.: 15/329,141

(22) PCT Filed: Jul. 8, 2015

(86) PCT No.: PCT/EP2015/001394
§ 371 (c)(1),
(2) Date: Jan. 25, 2017

(87) PCT Pub. No.: WO2016/015819
PCT Pub. Date: Feb. 4, 2016

(65) Prior Publication Data
US 2017/0217491 A1 Aug. 3, 2017

(30) Foreign Application Priority Data
Jul. 26, 2014 (DE) .................... 10 2014 011 194

(51) Int. Cl.
B62D 7/14 (2006.01)
B62D 17/00 (2006.01)
B60G 17/015 (2006.01)

(52) U.S. Cl.
CPC .......... B62D 17/00 (2013.01); B60G 17/0157 (2013.01); B62D 7/14 (2013.01);
(Continued)

(58) Field of Classification Search
CPC ........ B62D 17/00; B62D 17/14; B62D 17/18; B62D 5/0418; B62D 5/0481; B62D 7/14;
(Continued)

(56) References Cited

U.S. PATENT DOCUMENTS 4,836,577 A * 6/1989 Abe ...................... B60G 7/006
180/415
5,009,447 A 4/1991 Gabel
(Continued)

FOREIGN PATENT DOCUMENTS

CN 102427990 A 4/2012
DE 10 2009 025 586 12/2010
(Continued)

OTHER PUBLICATIONS

International Search Report issued by the European Patent Office in International Application PCT/EP2015/001394.
(Continued)

Primary Examiner — Laura Freedman
(74) Attorney, Agent, or Firm — Henry M. Feiereisen LLC

(57) ABSTRACT

A wheel carrier for a two-track motor vehicle including a wheel-side carrier part, which carries a vehicle wheel; an axle-side guide part; axle-side rotary parts arranged between the wheel-side carrier part and the axle-side guide part and supported on a common bearing site for rotation relative to each other about a rotation axis by respective rotation angles, wherein the carrier part is pivotable about the rotation axis about a pivot point for toe and/or camber adjustment of the vehicle wheel by rotation of at least one of the rotary parts by the respective rotation angle into a rotary position, which correlates with a toe and/or camber angle of the vehicle wheel, wherein the toe and/or camber angle being arbitrarily adjustable within a toe and/or camber (Continued)

angular range. The wheel carrier further includes at least one movement stop adapted for limiting the toe and/or camber angular range of the vehicle wheel.

20 Claims, 6 Drawing Sheets

(52) U.S. Cl.
CPC .... *B60G 2200/46* (2013.01); *B60G 2200/462* (2013.01); *B60G 2202/40* (2013.01); *B60G 2202/42* (2013.01); *B60G 2202/442* (2013.01); *B60G 2204/419* (2013.01); *B60G 2204/45* (2013.01); *B60G 2204/4502* (2013.01); *B60G 2206/50* (2013.01); *B60G 2600/21* (2013.01)

(58) Field of Classification Search
CPC .. B62D 7/18; B60G 17/0157; B60G 2204/45; B60G 2204/4502; B60G 2204/419; B60G 2600/21; B60G 2202/40; B60G 2202/42; B60G 2202/442; B60G 2200/46; B60G 2200/462; B60G 2206/50
See application file for complete search history.

(56) References Cited

U.S. PATENT DOCUMENTS

| | | | | |
|---|---|---|---|---|
| 6,374,665 | B1* | 4/2002 | Somppi | B62D 17/00 73/146 |
| 6,386,553 | B2* | 5/2002 | Zetterstrom | B60G 3/20 180/413 |
| 8,066,292 | B2* | 11/2011 | Mueller | B60G 7/006 280/93.503 |
| 8,162,332 | B2* | 4/2012 | Michel | B60G 3/26 280/86.751 |
| 8,313,110 | B2* | 11/2012 | Meitinger | B60G 7/006 280/5.521 |
| 8,322,729 | B2* | 12/2012 | Michel | B60G 7/006 280/5.52 |
| 8,419,022 | B2* | 4/2013 | Blondelet | B60G 7/006 280/5.52 |
| 8,459,661 | B2* | 6/2013 | Schmid | B60G 7/006 280/5.52 |
| 8,474,837 | B2* | 7/2013 | Meitinger | B60G 7/006 280/5.521 |
| 8,490,983 | B2 | 7/2013 | Schmid et al. | |
| 8,500,133 | B2* | 8/2013 | Michel | B60G 7/005 280/5.52 |
| 8,534,684 | B2* | 9/2013 | Michel | B60G 3/01 280/86.751 |
| 8,731,780 | B2 | 5/2014 | Michel et al. | |
| 8,801,107 | B2 | 8/2014 | Schmid et al. | |
| 8,857,921 | B2 | 10/2014 | Schmid et al. | |
| 8,886,400 | B2 | 11/2014 | Kossira et al. | |
| 8,894,077 | B2 | 11/2014 | Michel et al. | |
| 8,983,728 | B2 | 3/2015 | Kossira et al. | |
| 9,108,482 | B2 | 8/2015 | Mohrlock et al. | |
| 9,321,323 | B2 | 4/2016 | Schindler et al. | |
| 9,381,934 | B2 | 7/2016 | Pfeiffer et al. | |
| 9,393,848 | B2 | 7/2016 | Mohrlock et al. | |
| 9,393,911 | B2 | 7/2016 | Pfeiffer et al. | |
| 9,446,653 | B2 | 9/2016 | Schindler et al. | |
| 9,475,519 | B2 | 10/2016 | Nagl et al. | |
| 9,630,650 | B2* | 4/2017 | Pfeiffer | F16D 41/105 |
| 9,669,680 | B2* | 6/2017 | Yuta | B60G 21/051 |
| 2005/0146105 | A1 | 7/2005 | Soles et al. | |
| 2007/0131474 | A1 | 6/2007 | Zetterstroem | |
| 2010/0320706 | A1 | 12/2010 | Horiguchi et al. | |
| 2011/0193302 | A1 | 8/2011 | Horiguchi et al. | |
| 2012/0132020 | A1 | 5/2012 | Kunsch et al. | |
| 2012/0193882 | A1 | 8/2012 | Michel et al. | |
| 2012/0242053 | A1 | 9/2012 | Michel et al. | |
| 2012/0306173 | A1 | 12/2012 | Meitinger et al. | |
| 2013/0099455 | A1 | 4/2013 | Beringer et al. | |
| 2013/0175776 | A1 | 7/2013 | Michel et al. | |
| 2013/0249252 | A1 | 9/2013 | Schmid et al. | |
| 2014/0110996 | A1 | 4/2014 | Klinger | |
| 2017/0210422 | A1* | 7/2017 | Schmid | B62D 17/00 |
| 2017/0217492 | A1* | 8/2017 | Klinger | B62D 17/00 |
| 2017/0225531 | A1* | 8/2017 | Klinger | B60G 7/006 |
| 2018/0222271 | A1* | 8/2018 | Unger | B60G 3/265 |

FOREIGN PATENT DOCUMENTS

| | | |
|---|---|---|
| DE | 10 2009 038 423 | 3/2011 |
| DE | 10 2009 058 489 | 6/2011 |
| DE | 10 2010 018 135 | 10/2011 |

OTHER PUBLICATIONS

Chinese Search Report dated Jun. 4, 2018 with respect to counterpart Chinese patent application 2015800412682.
Translation of Chinese Search Report dated Jun. 4, 2018 with respect to counterpart Chinese patent application 2015800412682.

* cited by examiner

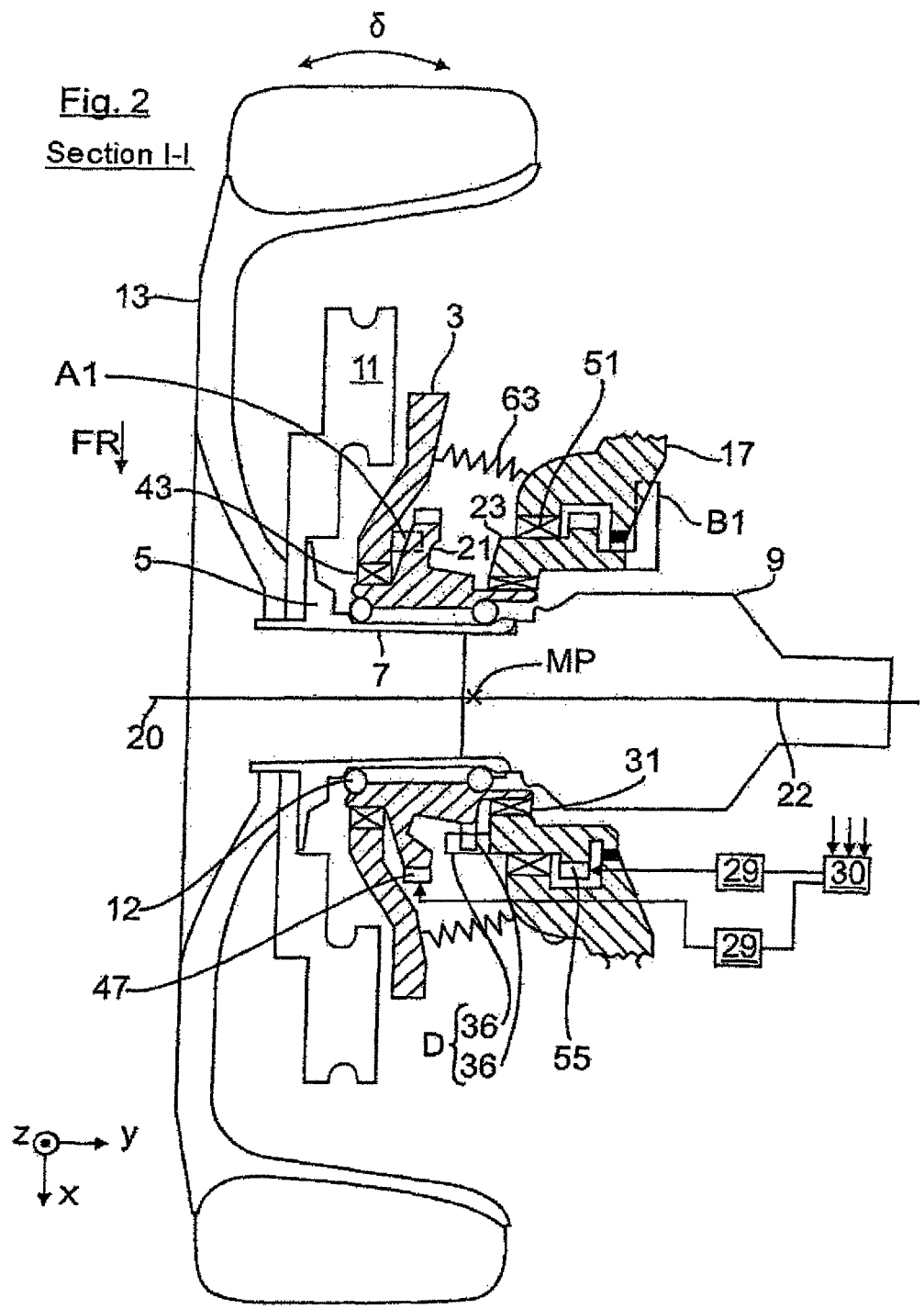

Section II-II

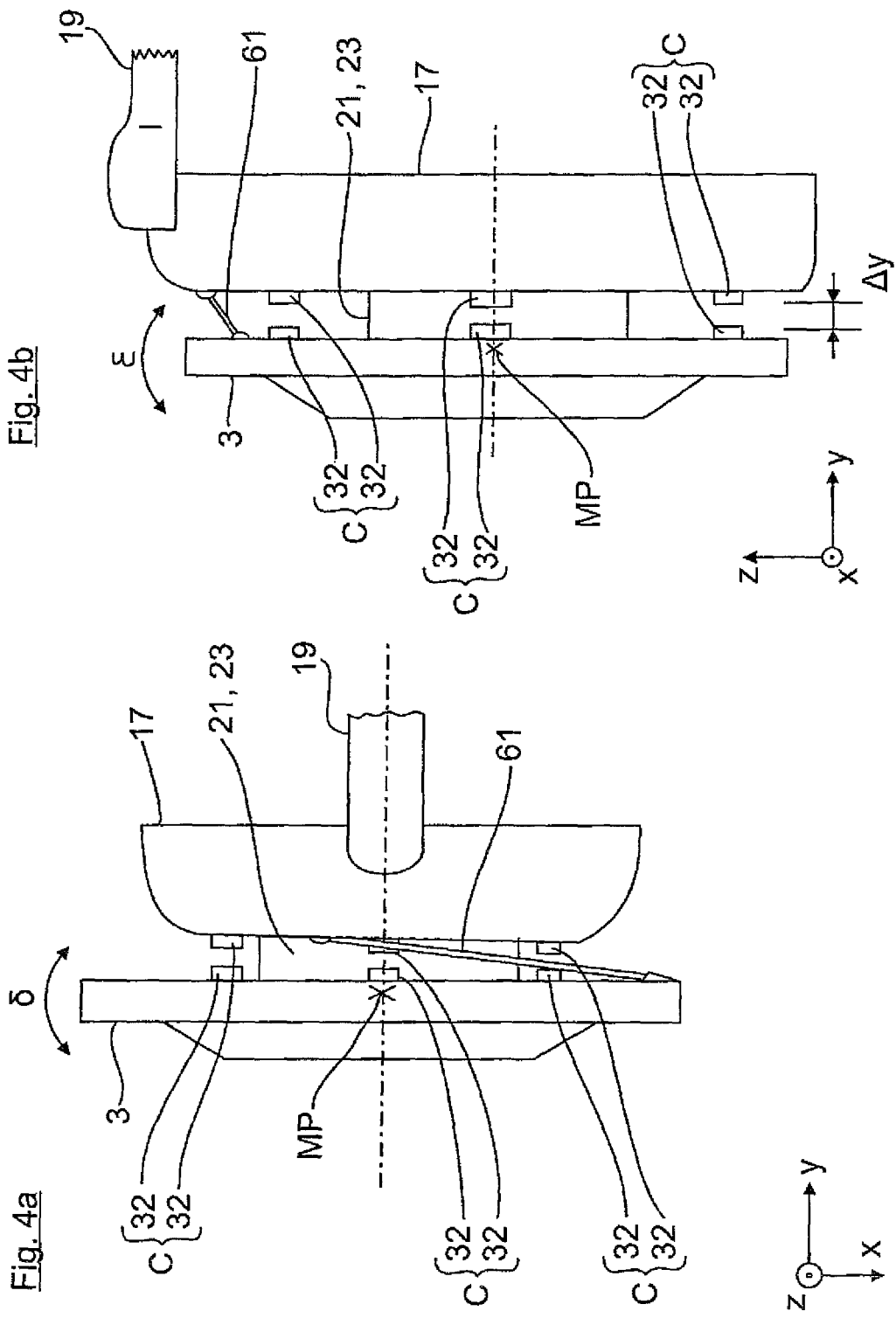

WHEEL CARRIER FOR A TWO-TRACK MOTOR VEHICLE

CROSS-REFERENCES TO RELATED APPLICATIONS

This application is the U.S. National Stage of International Application No. PCT/EP2015/001394, filed Jul. 8, 2015, which designated the United States and has been published as International Publication No. WO 2016/015819 and which claims the priority of German Patent Application, Serial No. 10 2014 011 194.6, filed Jul. 26, 2014, pursuant to 35 U.S.C. 119(a)-(d).

BACKGROUND OF THE INVENTION

The invention relates to wheel carrier for two-track motor vehicle according to the preamble of patent claim 1.

From DE 10 2009 058 489 A1 a generic wheel carrier for a vehicle wheel is known is configured multipart, i.e., with a wheel-side carrier part and an axle-side guide part and with rotary parts arranged there between. In the wheel-side carrier part a wheel bearing is integrated in which a wheel hub section of a wheel flange, which carries the vehicle wheel is rotatably supported. On the axle-side guide part the control arms of the wheel suspensions of the vehicle can be articulately connected. The wheel and axle-side rotary parts are respectively adjustable in the same and/or opposite direction by rotary angles and are supported for rotation relative to each other on a common rotary veering pint. The carrier part is pivotal about a center of rotation for toe/camber adjustment of the vehicle wheel. This is accomplished by a rotary adjustment of at least one of the rotary parts by a rotation angle into a rotary position, which correlates with a toe and/or camber angle of the vehicle wheel. As a result of the rotary adjustment the toe- and/or camber angle of the vehicle wheel can be arbitrarily adjusted within a toe-/camber angular range.

The rotary parts for toe-/camber adjustment are controlled by an electronic controller, which determines rotary angles for the rotary parts dependent on the actual driving operating parameters of the vehicle, based on which rotary angles the actuator motors of the rotary parts can be controlled. The rotary parts can for example be operated via a gear drive.

In such a gear drive the outer toothing can be provided over the entire circumference on the respective rotary part. Based on this outer toothing the maximal diameter of the outer toothing is limited because—when taking tolerances into account—the outer toothing has to be located within the surrounding components (for example brake caliper, an ABS sensor, control arm of the wheel suspension). In addition for a reliable control of the rotary parts expensive absolute-angle detectors are required in order to determine the absolute angular position of the rotary parts.

When a corresponding error occurs during actuation of the rotary parts, for example at the connected actuator motor, the vehicle wheel can be loosely spatially adjusted within the toe-/camber range. However when the operating range of the toe-/camber adjustment is limited in such a case collisions with other neighboring components are possible and have to be prevented, i.e., corresponding precautions have to be taken for a fail safe case, for example motor brakes which are automatically activated in case of failure of the actuator motor.

SUMMARY OF THE INVENTION

The object of the invention is to provide a wheel carrier in which wheel carrier internal collisions or collisions between the vehicle wheel and the suspension strut, vehicle wheel and body in white etc. can be more easily avoided in the event of an error.

The object is solved by the features of the independent patent claim. Preferred embodiments of the invention are disclosed in that dependent claims.

According to the invention, the wheel carrier has at least one movement stop with which the toe-/camber angular range of the vehicle wheel can be limited. Thus according to the invention when the above defined error occurs the rotation of the rotary parts is limited by the (in particular mechanical) movement stops so that they can only still be rotated over a limited angular segment. This angular segment can for example have an angle of 146°.

In a first embodiment the movement stop can be at least one rotary angle stop, which limits the absolute rotation of the respective rotary part. This means that the rotary angle stop limits a rotary adjustment between the rotatively fixed wheel-side carrier part and the wheel-side rotary part and/or between the rotatively fixed axle-side guide part and the axle-side rotary part. By means of the rotary angle stop the rotary adjustment of the rotary part can be limited to an angular segment, which is smaller than 360°, in particular smaller than 180°.

By shortening the angular segment to a range significantly smaller than 180° additional usable mounting space can be generated. Hereby (in case of a gear drive) minimum overlaps of the gearings, drive pinion/gear, tooth runout and minimum distances are to be taken into account. By correspondingly positioning the drive pinion installation space can be generated in a targeted manner, for example for a brake caliper, ABS sensor, control arm of the wheel suspension.

Another advantage of the above rotary angular stops on the rotary parts is that with the rotary angular stops a software function can be executed, which can replace the expensive absolute rotational speed sensors. When moving slowly into the movement stops the system recognizes at this time point the absolute position of the rotary parts and can immediately cooperate with relative rotational speed sensors (for example of the motor control). For redundancy reasons an absolute rotational speed sensor can additionally be provided. The function can be used for the vehicle start as well as for the initial operation (calibration of the possible absolute rotation speed sensors).

In addition the movement stops on the rotary parts can be configured relatively small because the torques acting on the rotary parts are relatively small. On the other hand the contact forces between the carrier part and the guide part can be much higher, i.e., due to the transmission ratio of the actuator (which is made of rotary parts and the carrier and guide parts).

As an alternative and/or in addition the movement stop can act directly between the carrier part (brake carrier) and the guide part. This means the rotations of the rotary part are not directly limited. Rather this movement stop acts directly between the carrier part (brake carrier) and the guide part (i.e. so that the carrier part is pressed against the guide part and thereby limits the toe and/or camber angle). During a camber/toe adjustment of the vehicle wheel a displacement path of the carrier art in the direction toward the guide part is thus limited. Such a movement stop can include pressure elements, which are formed on the carrier part (brake carrier) and/or on the guide part and can be brought in pressure contact with each other in the case of a camber-/toe adjustment of the vehicle wheel.

As an alternative and/or in addition the movement stop can limit a rotation of the rotary parts relative to each other. In this case the movement stop can have tappet elements, which are interposed between the two rotary parts. In the case of a rotary adjustment of at least one of the rotary parts the tappet elements can generate a movement coupling in which the two rotary parts can be adjusted over a common adjustment path in the same direction as well as with an identical adjustment speed.

Particularly preferred is a combination of movement stops, which limit the relative movement between the rotary parts as well as the absolute movements of the axle-side and wheel-side rotary parts with respect to the wheel-side carrier part and the axle-side guide part. In this case the above-mentioned pressure elements, which limit the displacement path of the wheel-side carrier part in the direction toward the guide part, are not required. Such pressure elements have to be able to withstand very great adjustment forces due to the high own transmission ratio of the wheel carrier and thus have to be constructed very robustly.

For toe-/camber adjustment an electronic controller with an analysis unit can be provided in which value pairs consisting of a rotary angle for the axle-side rotary part and a rotary angle for the wheel-side rotary part can be determined in dependence on driving operating parameters of the vehicle, on the basis of which value pairs the drive unit of the rotary part can be controlled.

The above-mentioned movement stops can preferably be configured as mechanical stop elements, which are formed on the wheel-side carrier part on the rotary parts and/or on the axle-side guide part. As an alternative thereto the movement stops can be configured electronically for example as contactless end position switches or the like. Such switches can for example be configured touch sensitive and grease resistant. When a rotary part moves past the switch an electric circuit can be closed and a switching impulse can be generated which is transmitted to the controller whereupon measures can be initiated which prevent a further rotation of the rotary part.

In a technical implementation of the wheel carrier the wheel-side rotary part can be rotatably connected with wheel-side carrier part so as to define a first rotary part axis on a bearing site. The axle-side rotary part can be rotatably connected with the guide part so as to define a second rotary part axis on a bearing site. In such a configuration a singularity results when the above defined rotary axles are oriented coaxial to each other in a zero position, i.e., they are oriented aligned, which is disadvantageous with respect to regulation. In the case of such a singularity the own transmission ratio is theoretically infinite and therefore a strongly accelerated rotative movement of the rotary parts is required in order to ensure a constant adjustment speed during the camber-/toe adjustment of the vehicle wheel. In order to avoid such a singularity the camber-/toe angular range that is limited by the movement stops can be preferably defined so that the zero position that leads to a singularity is situated outside the toe/camber range defined by the movement stops.

The advantageous embodiments and/or refinements of the invention explained above and/or set forth in the dependent claims can be used individually or in any combination with each other—except in case of clear dependencies or irreconcilable alternatives.

BRIEF DESCRIPTION OF THE DRAWING

In the following the invention and its advantageous embodiments and refinements and their advantages are explained in more detail by way of drawings.

It is shown in:

FIG. 2 a sectional view taken along the sectional plane I-I of FIG. 1;

FIGS. 4a and 4b views of the wheel carrier from above and from the rear;

DETAILED DESCRIPTION OF PREFERRED EMBODIMENTS

Figure 1:
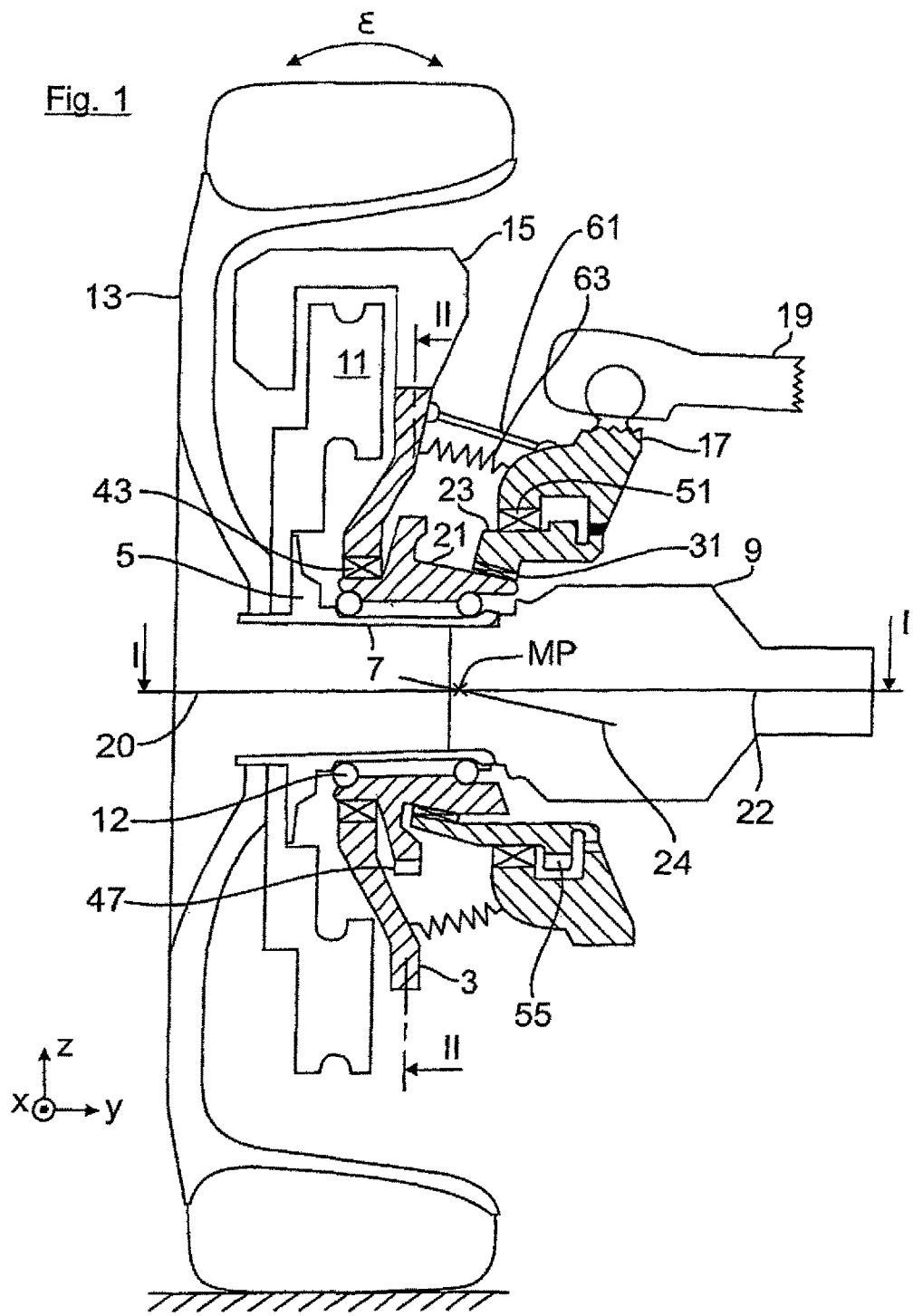
FIG. 1 a full, sectional view of the wheel carrier with mounted vehicle wheel.

FIG. 1 shows the wheel carrier with mounted vehicle wheel 13 in a side view. The wheel carrier has a carrier part 3 in which a wheel flange 5 is rotatably supported with its hub section 7 in a wheel bearing 12 with interposition of a bearing 43. On the wheel flange 5 a brake disc 11 and a vehicle wheel 13, via its wheel rim, are mounted. The brake disc 11 together with a brake caliper 15, which is mounted on the carrier part, are a component of the brake system. Through the wheel carrier an articulated shaft, which drives the vehicle wheel 13, is guided, wherein on the constant velocity joint 9 of the articulated shaft an also not shown central screw is screwed with which the wheel bearing 12 is clamped via the wheel hub 5 and the constant velocity joint 9.

The wheel carrier also has a guide part 17 on which in FIG. 1 exemplarily a control arm 19 of the wheel suspension is articulately connected. Between the carrier part 3 and the guide part 17 two rotary parts 21, 23 are provided as actuating elements. The rotary part 21 is rotatably connected with the carrier part 3 at a bearing site 43 so as to define a rotary part axis 20. The rotary part 23 is connected with the guide part 17 on a bearing site 51 so as to define a rotation axis 22. In FIG. 1 the two rotary parts 21, 23 are connected with each other via a common bearing site 31 for rotation relative to each other in rotation and/or slide support and via a rotation axis 24. The rotation axis 24 in FIG. 1 is oriented inclined at a respective defined angle relative to the rotary part rotation axis 20, 22.

FIGS. 1 and 2 show the two rotary parts 21, 23 exemplarily in a zero position in which the first rotary part axis 20 is oriented coaxial, i.e. aligned, with the second rotary part axis 22. With respect to regulation such a zero position leads to a disadvantageous singularity in which the own transmission ratio is theoretically infinite. Close to the singularity a very strongly accelerated rotary movement of the rotary parts 21, 23 is therefore required to ensure a constant adjustment speed during the camber-/toe adjustment of the vehicle wheel 13. For the regulation it is therefore advantageous when the zero position, which leads to the singularity, is outside of the permitted camber-/toe range S.

On the carrier part 3 as well as on the guide part 17 a respective actuating motor 29, which is only shown in FIG. 2, is mounted which is drivingly connected with the rotary parts 21, 23 via not shown gear drives. By means of the actuating motors 29 the two rotary parts 21, 23 can be rotated in the same direction or in the opposite directions, which cause the carrier part 3 to perform a pivot or tumbling movement about a center of rotation MP relative to the guide part 17 and thereby correspondingly changes the toe angle δ (FIG. 2) and/or the camber angle ε (FIG. 1) of the vehicle wheel 13.

The actuating motors 29 are shown in FIG. 2 in signal communication with an electronic controller 30 in which in dependence on driving operating parameters value pairs consisting of a rotation angle β for the wheel-side rotary part 21 and of a rotation angle θ for the axle-side rotary part 23 can be determined, on the basis of which the actuating motors 29 can be controlled for the toe/camber adjustment of the vehicle wheel 13.

The axle-side guide part 17—analogous to the wheel-side carrier part 3—is supported in a rotary bearing 51 radially outward on the axle-side rotary part 23. Further inwards in vehicle transverse direction y a further gearwheel section 55 is exemplarily formed on the outer circumference of the axle-side rotary part 23, which gearwheel section is also a part of the gear drive. The gear\wheel section 55 of the axle-side rotary part 23 is positioned in an annular space, which is delimited outwardly by the rotary bearing 51 and inwardly by an annular gasket, which is arranged between the guide part 17 and the axle-side rotary part 23. In addition further not shown gaskets can be present in the system.

In addition between the carrier part 3 and the guide part 17 in FIG. 1 a coupling rod 61 is mounted. The coupling rod acts as a torque transmission element via which torques, in particular a braking torque and/or motor torques of the outer rotary drive 29, can be transmitted from the carrier part 3 to the guide part, i.e., by bridging the axle-side and wheel-side rotary parts 21, 23. The coupling rod 61 is for example arranged radially outside a circumferential rubber or plastic sleeve 63, which seals the rotary parts 21, 23 and their bearing sites against dirt.

As can be seen from FIGS. 1 to 4 the wheel carrier has differently configured mechanical movement stops A1, A2, B1, B2, C and D with which the toe-/camber angle range S (FIG. 5*b*, 6*b*, 7*b*) of the vehicle wheel 13 can be limited. The rotary adjustment of at least one of the rotary parts 21, 23 about a rotary angle θ, β results in a toe-and/or camber adjustment. The toe-/camber adjustment delta, epsilon of the vehicle wheel 13 can be arbitrarily adjusted within the toe/camber angular range S.

Figure 3A:
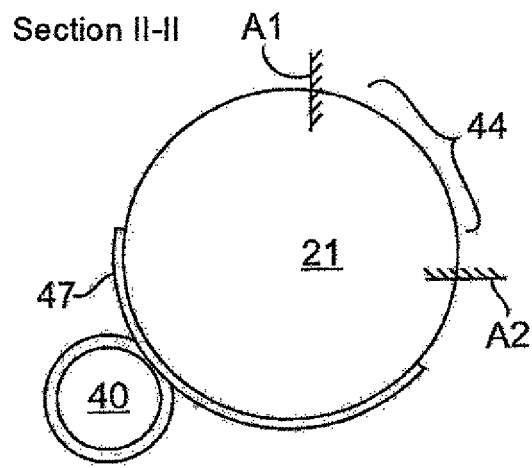
FIGS. 3a and 3b respectively simplified sectional views taken along to sectional plane II-II of FIG. 1.
Figure 3B:
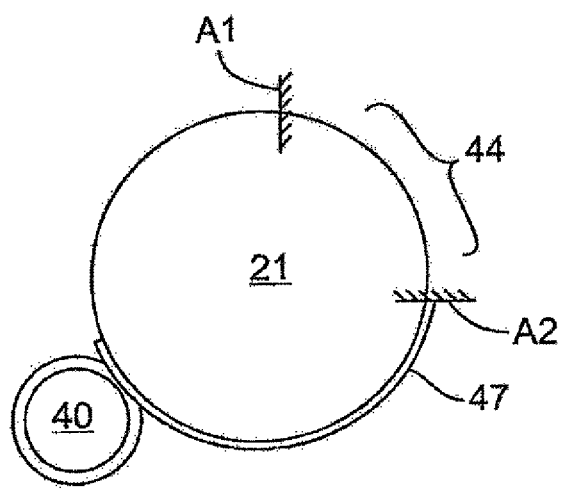

The movement stops A1 and B1 indicated in FIG. 2 are configured as rotary angular stops which limit a rotary adjustment between the rotatively fixed wheel-side carrier part 3 and the wheel-side rotary part 21 and between the rotatively fixed axle-side guide element 17 and the axle-side rotary part 23. Hereby by means of the rotary angular stops A1, A2, B1, B2 the rotary adjustment of the axle-side and wheel-side rotary part 21, 23 is limited to an angular segment Δβ, Δθ, which is for example smaller than 180°. The angular segment Δβ, Δθ can depending on geometric situation at hand also be configured greater than 180°. In FIGS. 3*a* and 3*b* the movement stops A1, A2 interact with the respectively confronting ends of the toothing 47.

The movement stop C, which is only shown in FIGS. 4*a* and 4*b*, has pressure elements 32, which are arranged aligned with each other in vehicle transverse direction y and are exemplarily formed pairwise on the carrier part 3 and on the guide part 17 and can be brought in pressure contact with each other during a camber-/toe adjustment of the vehicle wheel 13. In this way during a camber-/toe adjustment of the vehicle wheel 13 a displacement path Δy of the carrier part 3 in the direction toward the guide part 17 is limited.

FIG. 2 also shows the movement stop D. The movement stop D has tappet elements 36, which correspond to each other and which are formed on the axle-side as well as on the wheel-side rotary part 21, 23. The movement stop D limits the relative rotation between the rotary parts 21, 23. This means when the tappet elements 36 of the movement stop D contact each other the rotary parts 21, 23 are movement coupled and the two rotary parts 21, 23 are adjusted over an adjustment path V (FIG. 7*a*) in the same direction as well as with identical adjustment speed. When the movement stop D is in contact the two rotary parts 21, 23 cannot be moved further relative to each other. Only coupled movements are possible or the relative movement in such a manner that the contact site of the movement stop D is opened again.

FIGS. 3*a* and 3*b* show the gearwheel connection between a drive pinion 40 of the actuating motor 29 or an intermediate gear and an outer toothing 47 of the wheel-side rotary part 21 indicated in dotted-dashed lines in different operating states. Accordingly the outer toothing 47 does not completely extent about the wheel-side rotary part 21 but only partially over an angular segment. As a result of the shortening of the outer toothing 47 to a region, which is significantly smaller than 180°, additional usable mounting space 44 can be generated. As a result of corresponding position of the spur gear 40 the mounting space 44 can be positioned in a targeted manner for example for a brake caliper, an ABC sensor and/or a control arm of the wheel suspension. Correspondingly also the outer toothing 55 of the -side rotary part 23 can be shortened to an angular segment.

Figure 5A:
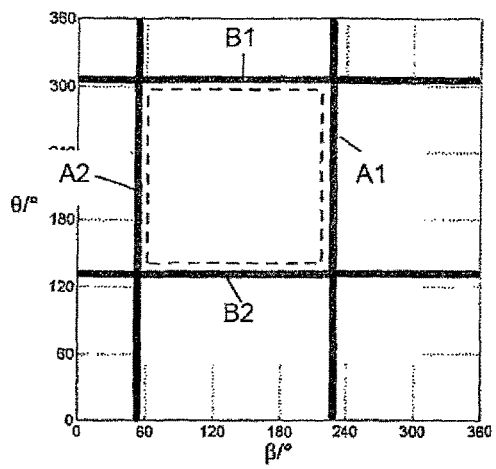
FIGS. 5a and 5b respectively diagrams which illustrate the rotary angular range limited by the movement stops with correlating tow-camber angular range according to a first exemplary embodiment.
Figure 5B:
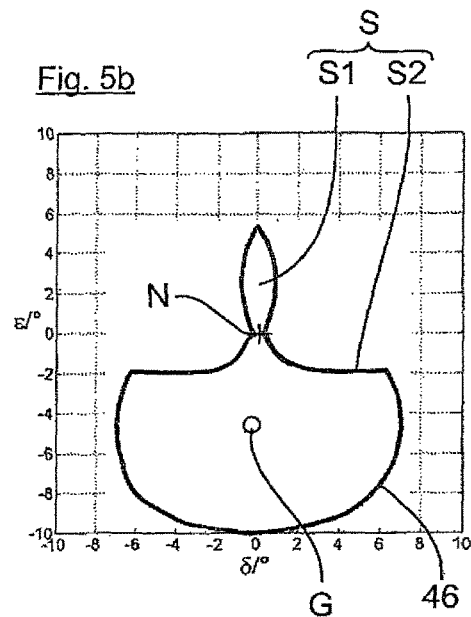

In the following different camber-/toe ranges S, which are defined by the provision of different movement stops, are exemplarily shown by way of the diagrams of FIGS. 5 to 7. Thus according to FIG. 5*a* the rotary angular stops A1, A2, B1, B2 are formed in the wheel carrier, which limit the rotation angle β of the wheel-side rotary part 21 to an angular range of about 50° to about 220° and limit the rotation angle θ of the axle-side rotary part 23 to an angular range of about 130° to about 300°. The region of the possible adjustment angles indicated in FIG. 5*a* with a dashed line corresponds to the toe-/camber angular range S shown in FIG. 5*b*, which is delimited by an envelope curve 46. In FIG. 5*b* the toe/camber angular range S has a positive camber angular range S1 and a negative camber angular range S2. In addition the defined zero position N, which leads to a singularity, is located in FIG. 5*b* within the toe-/camber angular range S.

Figure 6A:
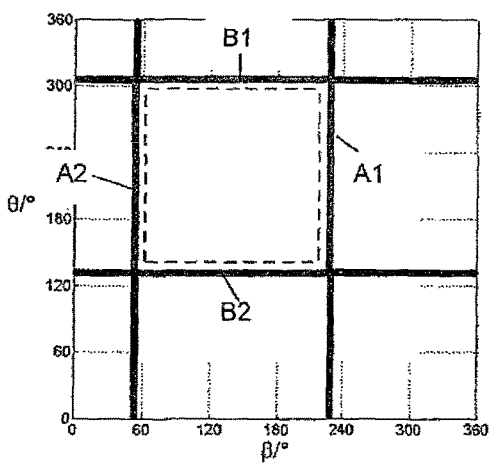
FIGS. 6a and 6b views corresponding to those of FIGS. 5a and 5b according to a second exemplary embodiment.
Figure 6B:
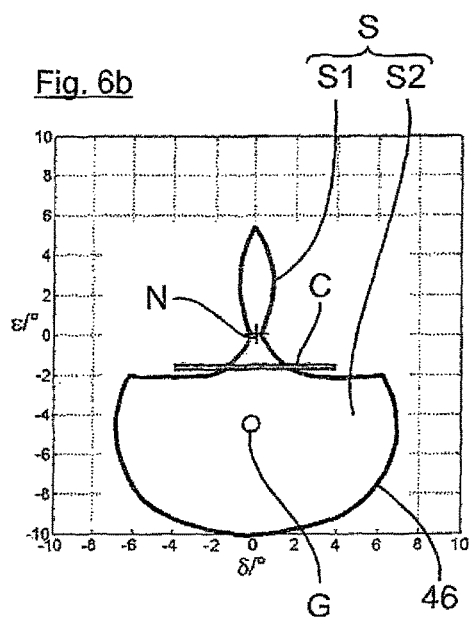

In contrast thereto in FIGS. 6*a* and 6*b* the movement stop C is provided in addition to the rotary angular stops A1, A2, B1, B2, which acts directly between the carrier part 3 and the guide part 27, i.e., limits the displacement path Δy (FIG. 4*b*) of the carrier part 3. By means of the movement stop C the permissible toe-/camber angular range S is further limited i.e., by omission of the positive camber angular range S1, which is not required for the camber—and/or toe adjustment. The maximally permissible camber angle ε in FIG. 6*b* is exemplarily limited to about −2°. In addition the zero position N, which leads to a singularity, is now advantageously situated outside the toe-/camber angular range S and can therefore no longer be executed. According to FIG. 6*b* the camber and toe adjustment is performed within a technically reasonable range, i.e., starting from a rotary part base position G for example over a camber angle ε of about +2.5/−5.5° and over a toe angle δ of about +/−6.5°.

The movement stop C, which is directly interposed between the carrier part 3 and the guide part 17, is subjected to very great forces due to the own transmission ratio of the actuator (i.e., the rotary parts 21, 23) and therefore has to be configured correspondingly robust and with this has a great weight. On the other hand the movement stops A, B, D on the rotary parts 21, 23 can be implemented particularly easily and with a low weight and low costs. In addition the stops A, B, D are not as sensitive regarding tolerances as the stop C.

Figure 7A:
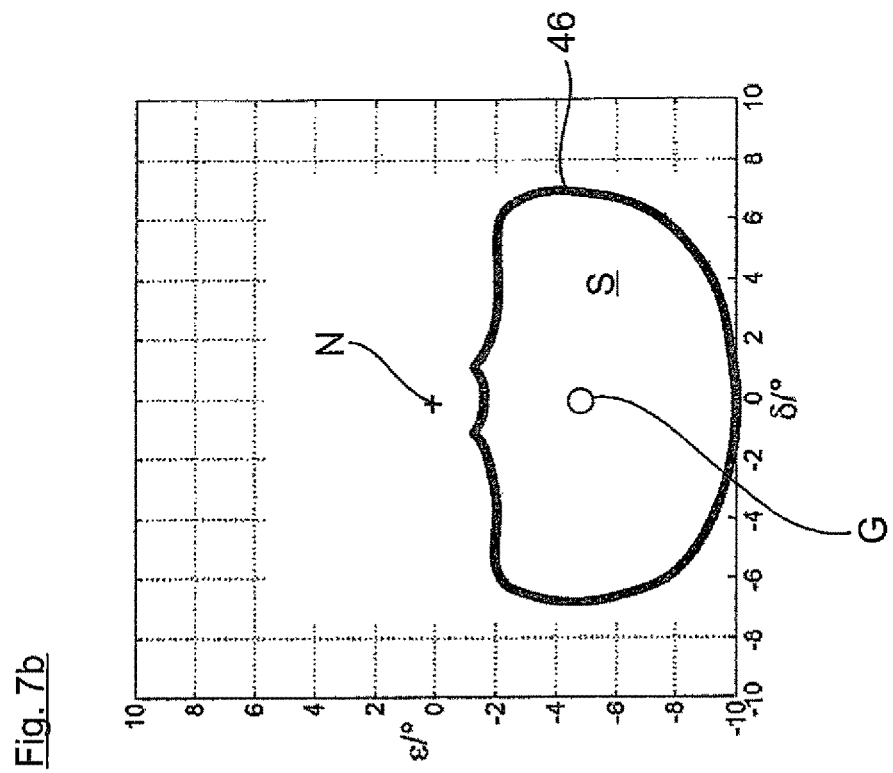
FIGS. 7a and 7b views corresponding to those of FIGS. 5a and 5b according to a third exemplary embodiment.
Figure 7B:
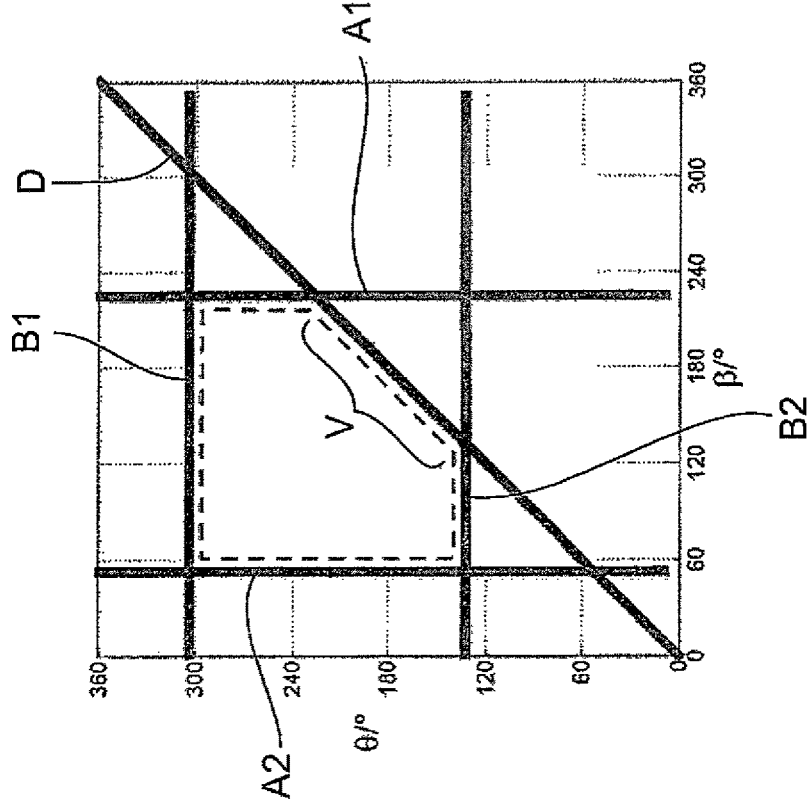

In light of the foregoing the exemplary embodiment shown in FIGS. 7a and 7b is advantageous in which the camber/toe angular range S available in FIG. 7b is substantially identical with the one of FIG. 6b. The region in FIG. 7a of the possible adjustment angles framed with a dashed line corresponds to the toe-/camber angular range S shown in FIG. 7b, which is delimited by the envelope curve 46. In the exemplary embodiment of FIGS. 7a and 7b however the movement stop D is implemented instead, which limits with its tappet elements 36 (FIG. 2) the relative movement of the two rotary parts 21, 23, i.e., in such a manner so that during a rotary adjustment one of the rotary parts 21, 23 first generates a movement coupling in which the two rotary parts 21, 23 are adjusted over an adjustment path V (FIG. 7a) in the same direction as well as with identical adjustment speed. When the movement stop D is in contact the two rotary parts 21, 23 cannot be moved further relative to each other. Only coupled movements are possible or the relative movement is possible only when the contact site of the movement stop D is opened again.

Depending on the circumferential length of the tappet elements 63 the movement stop D can also act on both sides. Correspondingly the adjustment range β, θ would be formed between two angle bisectors in the diagram of FIG. 7a.

The movement stops A1, A2, B1, B2, C, D described above can also be taken into account in the electronic controller 30. In particular the mechanical movement stops A1, A2, B1, B2, C, D can be used to train the rotary angular senor system for detecting the angular positions of the rotary parts 21, 23.

The invention claimed is:

1. A wheel carrier for a motor vehicle, comprising:
a wheel-side carrier part which carries a vehicle wheel;
an axle-side guide part;
rotary parts arranged between the wheel-side carrier part and the axle-side guide part,
wherein the rotary parts are supported on a common bearing site for rotation relative to each other about a rotation axis by respective rotation angles in a same direction or opposite directions of rotation,
said carrier part being pivotable about the rotation axis about a pivot point for toe and/or camber adjustment of the vehicle wheel by rotation of at least one of the rotary parts by the respective rotation angle into a rotary position, which correlates with a toe and/or camber angle of the vehicle wheel, said toe and/or camber angle being arbitrarily adjustable within a toe and/or camber angular range; and
at least one movement stop arrange to act between the carrier part and the guide part or between the rotary parts for limiting the toe and/or camber angular range of the vehicle wheel.

2. The wheel carrier of claim 1, wherein the wheel-side carrier part and the axle-side guide part are rotatively fixed, and wherein the at least one movement stop is constructed as a rotary angular stop, which limits a rotary adjustment between the rotatively fixed wheel-side carrier part and a wheel-side one of the rotary parts and/or between the rotatively fixed axle-side guide part and an axle-side one of the rotary parts.

3. The wheel carrier of claim 2, further comprising a further movement stop, with at least one of the further movement stop and the rotary angular stop having mechanical stop elements which are formed on at least one of the wheel side carrier part, the rotary parts and the axle-side guide part.

4. The wheel carrier of claim 1, wherein the movement stop limits a rotary adjustment of an associated one of the rotary parts to an angular segment smaller than 360°.

5. The wheel carrier of claim 1, wherein the movement stop limits a rotary adjustment of an associated one of the rotary parts to an angular segment smaller than 180°.

6. The wheel carrier of claim 1, further comprising plural of said at least one movement stop which interact with respective confronting ends of toothings of the rotary parts.

7. The wheel carrier of claim 1, wherein the at least one movement stop during a toe and/or camber adjustment of the vehicle wheel limits a displacement path of the carrier part in a direction towards the guide part.

8. The wheel carrier of claim 1, wherein the at least one movement stop has pressure elements, which are formed on the carrier part and/or on the guide part, and which are engageable in pressure contact with each other during a toe and/or camber adjustment of the vehicle wheel.

9. The wheel carrier of claim 1, wherein the at least one movement stop has tappet elements, which are interposed between the rotary parts.

10. The wheel carrier of claim 1, wherein the at least one movement stop during a rotary adjustment of at least one of the rotary parts generates a movement coupling in which the rotary parts are adjustable over an adjustment path in a same direction and with identical adjustment speeds.

11. The wheel carrier of claim 1, wherein the at least one movement stop is configured as an electronic movement stop.

12. The wheel carrier of claim 1, wherein the at least one movement stop is configured as an end position switch.

13. The wheel carrier of claim 1, further comprising an electronic controller having an analysis unit and adapted for implementing the toe and/or camber adjustment and for determining, as a function of driving operating parameters of the vehicle, a value pair defined by the rotation angle for one of the rotary parts and the rotation angle for the other one of the rotary parts, with a drive unit of the rotary parts being controllable unit based on said value pair.

14. The wheel carrier of claim 13, wherein the at least one movement stop is taken into account in the electronic controller.

15. The wheel carrier of claim 1, wherein a wheel-side one of the rotary parts is ratably connected with the wheel-side carrier part at a bearing site and defines a first rotary part axis and an axle-side one of the rotary parts is rotatably connected with the guide part at another bearing site and defines a second rotary part axis.

16. The wheel carrier of claim 15, wherein in a zero position the first and second rotary part axes are coaxial relative to each other so as to form a singularity and wherein the toe and camber angles that correlate with the zero position are situated outside of the toe and/or camber range of the vehicle wheel defined by the at least one movement stop.

17. The wheel carrier of claim 15, wherein in a zero position the first and second rotary part axes are coaxial relative to each other so as to form a singularity, with the toe and/or camber angles that correlate with the zero position being situated outside of the toe and/or camber angular range of the vehicle wheel defined by the movement stop, or wherein for avoiding the singularity a position of the first and second rotary part axes is selected so that the first and second rotary part axes are not arranged coaxial to each other at any operating time point.

18. The wheel carrier of claim 1, wherein at least one of the rotary parts has an outer toothing, which is a part of a gear stage which is drivingly connected with a rotary part drive unit, with the outer toothing extending partially about the associated rotary part over an angular segment.

19. The wheel carrier of claim 1, wherein the at least one movement stop is configured for reducing load peaks with correspondingly soft characteristic curves, and wherein the characteristic curves can have different digressive, progressive or linear courses.

20. The wheel carrier of claim 1, wherein the at least one movement stop forms an input for teaching a rotary angle sensor system which is adapted for detecting an angular position of the rotary parts, and wherein upon contact of the at least one movement stop the sensor system recognizes a respective absolute position of the rotary parts.

* * * * *